US011921614B2

(12) United States Patent
Gruenwald

(10) Patent No.: US 11,921,614 B2
(45) Date of Patent: *Mar. 5, 2024

(54) SYSTEM AND METHOD FOR DEVELOPING, TESTING AND DEBUGGING SOFTWARE FOR MICROCONTROLLERS

(71) Applicant: Snabb IP LLC, Newtown, PA (US)

(72) Inventor: Bjorn J. Gruenwald, Newtown, PA (US)

(73) Assignee: Snabb IP LLC, Newtown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,542

(22) Filed: Mar. 16, 2023

(65) Prior Publication Data
US 2023/0244592 A1  Aug. 3, 2023

Related U.S. Application Data

(63) Continuation of application No. 17/590,953, filed on Feb. 2, 2022, now Pat. No. 11,630,757.

(51) Int. Cl.
G06F 11/36 (2006.01)
G06F 8/41 (2018.01)
G06F 9/445 (2018.01)

(52) U.S. Cl.
CPC ............ G06F 11/3604 (2013.01); G06F 8/44 (2013.01); G06F 9/445 (2013.01); G06F 11/362 (2013.01);
(Continued)

(58) Field of Classification Search
None
See application file for complete search history.

(56) References Cited

U.S. PATENT DOCUMENTS 5,255,382 A * 10/1993 Pawloski ............ G06F 12/0623
711/2
7,996,651 B2 * 8/2011 Julicher .............. G06F 9/30181
711/220

(Continued)

Primary Examiner — Ryan D. Coyer
(74) Attorney, Agent, or Firm — Toering Patents PLLC

(57) ABSTRACT

Various implementations of the invention develop executable code for an embedded system, including a microcontroller and a device. Some implementations of the invention comprise a microcontroller development tool configured to operate on a general purpose computer. In some implementations, the development tool comprises: 1) a virtual microcontroller configured to operate within the development tool in a manner substantially identical to an operation of the microcontroller of the embedded system, wherein the virtual microcontroller operates within the development tool using op codes native to that of the microcontroller, the virtual microcontroller further configured to receive inputs from and provide outputs to the device of the embedded system, 2) an expanded memory beyond a memory available to the microcontroller, the expanded memory available to the virtual microcontroller and configured to store op codes or data for the virtual microcontroller to assist with development of executable code, and 3) a microcontroller programmer configured to transfer executable code to a memory of the microcontroller, wherein the executable code is developed within the development tool; and a microcontroller coupler configured to couple the development tool to the embedded system.

7 Claims, 4 Drawing Sheets

(52) U.S. Cl.
CPC ...... *G06F 11/3664* (2013.01); *G06F 11/3688* (2013.01)

(56) References Cited

U.S. PATENT DOCUMENTS

| | | | |
|---|---|---|---|
| 8,117,587 B1* | 2/2012 | Testardi | G06F 11/3664 717/100 |
| 2005/0028132 A1* | 2/2005 | Srinivasamurthy | G06F 9/45516 717/100 |
| 2017/0131977 A1* | 5/2017 | Brabender | G06F 8/41 |
| 2021/0303324 A1* | 9/2021 | Tsirkin | G06F 9/5027 |
| 2021/0406442 A1* | 12/2021 | Mao | G06F 30/3308 |

* cited by examiner

SYSTEM AND METHOD FOR DEVELOPING, TESTING AND DEBUGGING SOFTWARE FOR MICROCONTROLLERS

CROSS-REFERENCE TO RELATED APPLICATION

The Application is a continuation application of U.S. application Ser. No. 17/590,953, filed Feb. 2, 2022, entitled "System and Method for Developing, Testing and Debugging Software for Microcontroller," now U.S. Pat. No. 11,630,757, which is incorporated herein by reference in its entirety.

FIELD OF THE INVENTION

The invention is generally related to microcontrollers, and more particularly, to developing, testing and/or debugging software for microcontrollers.

BACKGROUND OF THE INVENTION

Microcontrollers ("MCUs") are typically complete, self-contained computer systems on a single chip, and often find use in embedded applications. MCUs stand in contrast to microprocessors, which are typically used in personal computers or other general purpose computing applications, consisting of various discrete chips mounted on a printed circuit board (i.e., motherboard).

MCUs typically include, on a single chip, one or more CPUs (i.e., processor cores) along with memory (e.g., RAM, ROM, flash, EEPROM, and/or other memory). and programmable input/output interfaces (e.g., I/O ports, serial port interface, network interfaces, UARTs, timers, A/D converters, and/or other interfaces). Because of space limitations on the single chip, memory on MCUs is often quite limited compared with that used on/with microprocessors, including most general purpose computers (e.g., personal computers, laptops, etc.).

As a result of their small size, MCUs are often used in embedded systems. Input and output (110) devices coupled to such MCUs (or such embedded systems) often include switches, relays, solenoids, LEDs, small or custom liquid-crystal displays, radio frequency devices, etc., and/or sensors, including, but not limited to pressure, temperature, humidity, light levels, and/or other sensors as would be appreciated. Embedded systems usually have no keyboard, screen, disks, printers or other recognizable generic I/O devices typically associated with a general purpose computer and may often lack user interfaces of any kind.

The embedded systems in which MCUs are used include various automatically controlled products and devices such as automobile engine control systems, aerospace control systems, nuclear and electrical power control systems, implantable medical devices, remote controls, office machines, appliances, telephones, power tools, peripherals for computer systems, home and industrial security systems, toys and other embedded systems as would be appreciated. Nearly every modern machine is controlled in some fashion with an embedded system that includes an MCU. In the context of the Internet of Things, MCUs are an economical and popular means of data collection, sensing and actuating the physical world as edge devices, which provide entry points into other systems and services as would be appreciated.

During development and testing, MCUs are typically supported by a range of microcontroller development tools. Such development tools typically include hardware tools (emulators, programmers, analyzers), a software package (code editor, assembler-linker, debugger, archiver) and a software compiler as would be appreciated. These microcontroller development tools are often integrated into a single package and referred to as a development studio.

These development tools typically do not allow for direct connection and/or interaction with the device. A developer writes source code (using whatever tools and libraries are provided), compiles the source code, links the compiled code and loads the executable code into the MCU. Notwithstanding the plethora of syntax errors and time consumed with compiling, linking and loading code into the MCU, the developer still has no guarantee of the validity of any actual program logic, which can only be achieved by running the executable code on the MCU.

As would be readily appreciated, such executable code seldom works on first attempt (or for many dozens of attempts thereafter). Some development tools typically employ hardware analyzers—some quite sophisticated—to follow a sequence of events occurring during running of the executable code. Once a problem is identified and resolved, the process of compiling, linking and loading is repeated to track down the next problem.

One conventional software development tool uses inline debugging code, which may be used in combination with various data storage of interim data values, or temporary (i.e., non-production) storage of time-sequenced data. However, such additional debugging code or additional data storage associated with such debugging code often results in expansion of memory requirements beyond the capabilities of the MCU.

What is needed is a system and method for developing, testing and/or debugging software for MCUs to overcome these and other associated problems.

SUMMARY OF THE INVENTION

Various implementations of the invention develop, test and debug software for microcontrollers ("MCUs"), particularly for those MCUs in embedded systems. In some implementations of the invention, a system for developing executable code for an embedded system, including a microcontroller and a device, comprises a microcontroller development tool configured to operate on a general purpose computer, where the development tool comprises: 1) a virtual microcontroller configured to operate within the development tool in a manner substantially identical to an operation of the microcontroller of the embedded system, wherein the virtual microcontroller operates within the development tool using op codes native to that of the microcontroller, the virtual microcontroller further configured to receive inputs from and provide outputs to the device of the embedded system, 2) an expanded memory beyond a memory available to the microcontroller, the expanded memory available to the virtual microcontroller and configured to store op codes or data for the virtual microcontroller to assist with development of executable code, and 3) a microcontroller programmer configured to transfer executable code to a memory of the microcontroller, wherein the executable code is developed within the development tool; and a microcontroller coupler configured to couple the development tool to the embedded system.

In some implementations of the invention, a method for developing, testing, and/or debugging software for a microcontroller operating in an embedded system with a device, where the method comprises: receiving, from a user via a command line of a development tool operating on a computing processor, an op code for a virtual microcontroller, wherein the virtual microcontroller is configured to operate within the development tool in a manner substantially identical to an operation of the microcontroller of the embedded system, wherein the virtual microcontroller is further configured to operate within the development tool using op codes native to that of the microcontroller, wherein the development tool comprises an expanded memory beyond a memory available to the microcontroller, wherein the expanded memory is coupled to the virtual microcontroller and is configured to store op codes or data for the virtual microcontroller; executing the op code in the virtual microcontroller, wherein the op code causes the virtual microcontroller to obtain an input from the device of the embedded system or causes the virtual microcontroller to provide an output to the device of the embedded system; in response to executing the op code, providing a state of the virtual microcontroller to the user to verify the op code; receiving the verified op code along with another verified op code as a code snippet; executing the code snippet in the virtual microcontroller; in response to executing the code snippet, updating the state of the virtual microcontroller to the user to verify the code snippet; receiving a plurality of verified code snippets with a debug op code as test code; executing the test code in the virtual microcontroller, wherein executing the test code utilizes the expanded memory; in response to executing the test code, updating the state of the virtual microcontroller to the user to verify the test code; receiving executable code, wherein the executable code includes the verified test code without the at least one debug op code; executing the executable code in the virtual microcontroller; in response to executing the executable code, updating the state of the virtual microcontroller to the user to verify the executable code; and loading the verified executable code from the development tool into the microcontroller.

These and other implementations of the invention are described in further detail below in connection with the accompanying drawings.

DETAILED DESCRIPTION

Various implementations of the invention are directed towards systems and methods for developing, testing and debugging software code for microcontrollers ("MCUs"). In some implementations of the invention, a microcontroller development tool provides various capabilities for developing, testing and debugging software for MCUs.

Figure 1:
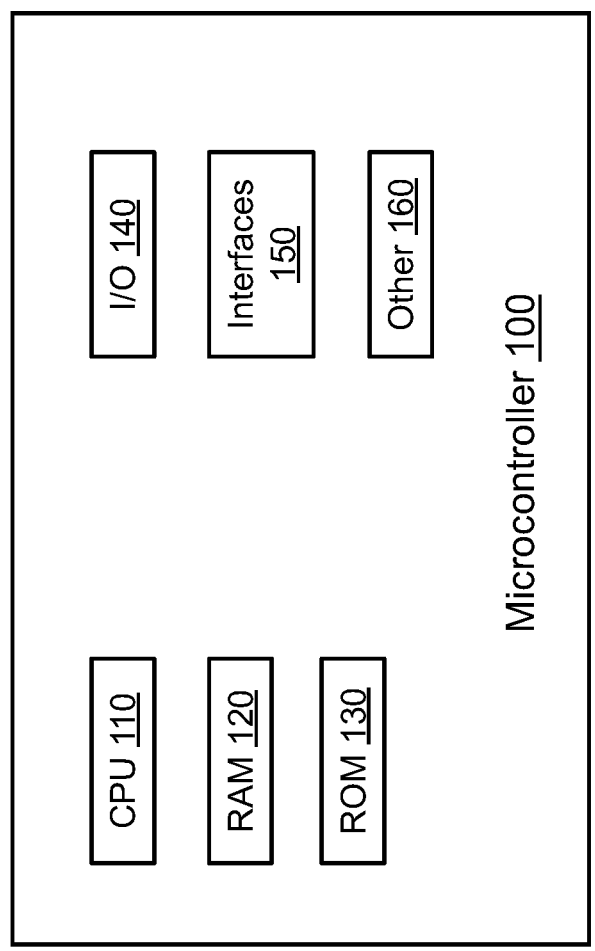
FIG. 1 illustrates a conventional microcontroller ("MCU") in accordance with various implementations of the invention.

FIG. 1 illustrates a microcontroller 100 ("MCU 100") that may be used in accordance with various implementations of the invention. MCU 100 may include one or more CPUs 110 (e.g., a processing core(s)), a random access memory ("RAM") 120, a read only memory ("ROM") 130, input/output data ports 140 ("I/O 140"), other interfaces 150 (e.g., serial ports, UARTs, etc.), and/or other MCU components 160 as would be appreciated.

Figure 2A:
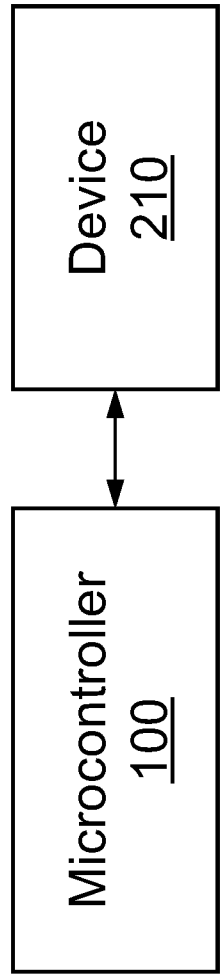
FIGS. 2A-2B illustrate various embedded systems, including an MCU and a device, coupled to one another in accordance with various implementations of the invention.

FIG. 2A illustrates an example embedded system 200A according to various implementations of the invention. Embedded system 200A includes a MCU 100 and a device 210. As described above, device 210 may include any number of actuators and/or sensors that may be used in a control or sensing application as would be appreciated. As illustrated, MCU 100 may be bi-directionally coupled to device 210, which suggests that MCU 100 may receive input from device 210 and provide output to device 210, in accordance with various implementations of the invention. In some implementations, MCU 100 may be unidirectionally coupled to device 210, which suggests that MCU 100 may either receive input from device 210 or provide output to device 210. In some implementations, MCU 100 provides control signals to device 210 and receives data back from device 210 as would be appreciated. In various implementations, MCU 100 is coupled to device via optional wired control signals as would be appreciated. In various implementations, MCU 100 is coupled to device via an optional wired data bus as would be appreciated.

Figure 2B:
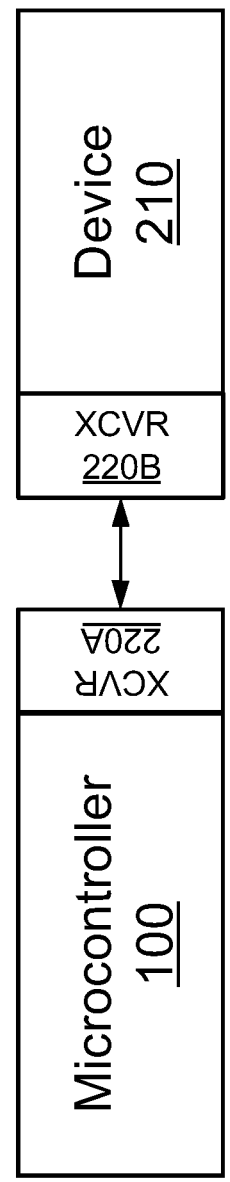

FIG. 2B illustrates an example embedded system 200B according to various implementations of the invention. Embedded system 200B includes a MCU 100 and a device 210, where MCU 100 includes a transceiver 220A and device 210 includes a corresponding transceiver 220B. As would be appreciated, transceivers 220 provide various wired or wireless communication, control, and/or data exchange between MCU and device 210. In some implementations, transceiver 220A may be integral with MCU 100. In some implementations, transceiver 220B may be integral with device 210. In some implementations, transceivers 220 may be separate from MCU 100 and/or device 210. Various transceivers 210 may be used as would be appreciated.

Figure 3:
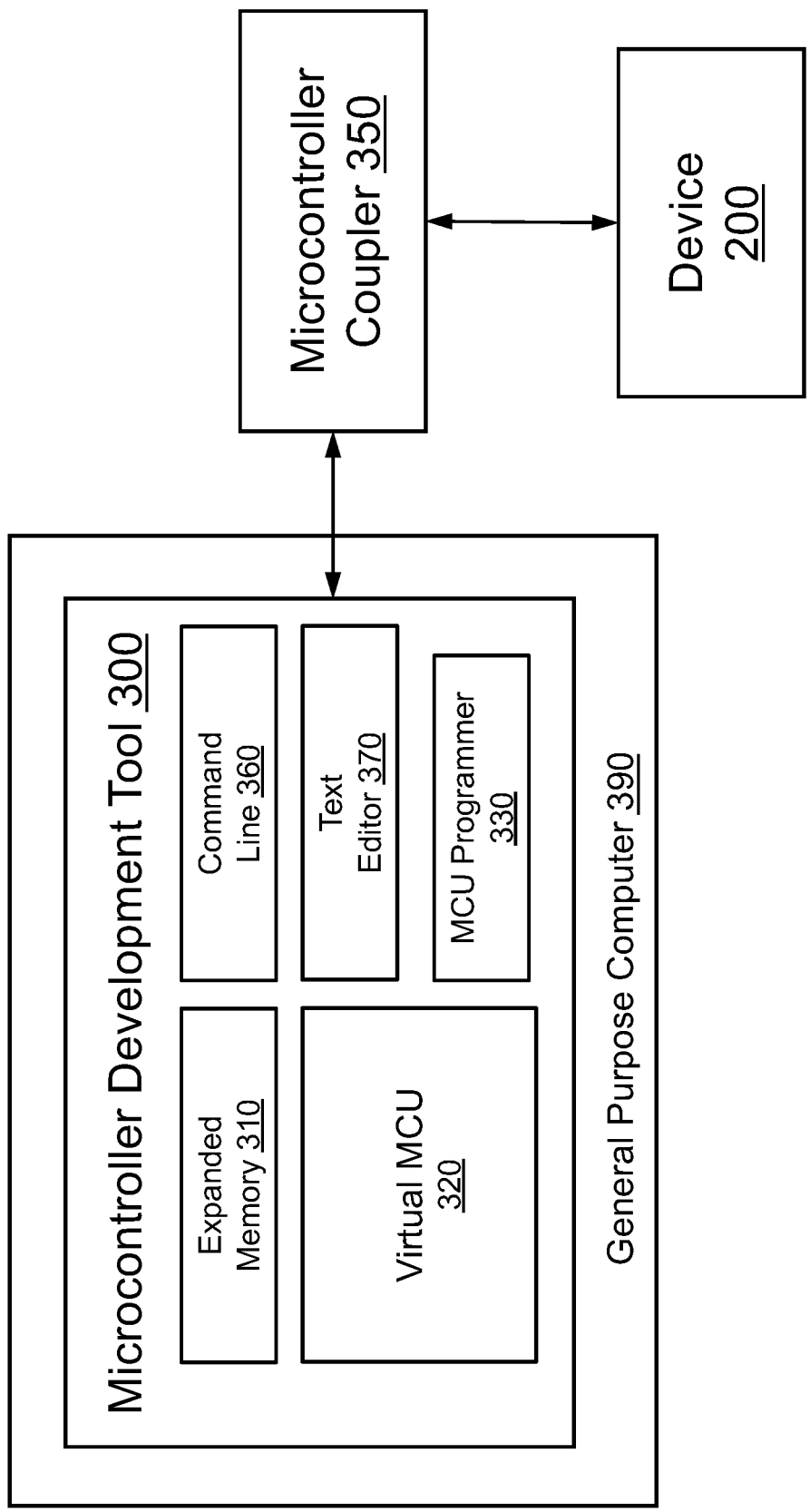
FIG. 3 illustrates a microcontroller development tool useful for developing, testing, and debugging software for MCUs in accordance with various implementations of the invention.

FIG. 3 illustrates a microcontroller development tool 300 configured to develop, test, and/or debug software for MCU 100 of embedded system 200 (i.e., either embedded system 200A or embedded system 200B) in accordance with various implementations of the invention. In some implementations of the invention, development tool 300 may include a virtual MCU 320 including an expanded memory 310, a command line 360, a text editor 370, and an MCU programmer 330. In some implementations of the invention, development tool 300 may be configured to operate on a general purpose computer 390, including a keyboard and/or other user input device and/or a monitor and/or other peripherals, as would be appreciated.

As illustrated in FIG. 3, development tool 300 is coupled to device 200 via a microcontroller coupler 350 ("MCU coupler 350"). In some implementations, MCU coupler 350 is a connector similar to one that provides MCU 100 with a connection to device 200. In some implementations, MCU coupler 350 is a connector similar to one that provides MCU 100 with an electrical connection to device 200. In some implementations, MCU coupler 350 is a connector similar to one that provides MCU 100 with an optical connection to device 200. In some implementations, MCU coupler 350 is a connector similar to one that provides MCU 100 with a serial connection to device 200. In some implementations, MCU coupler 350 is a connector similar to one that provides MCU 100 with a parallel connection to device 200. In some implementations, MCU coupler 350 is configured to occupy an identical footprint and/or pinout of MCU 100. In such implementations, MCU 100 may be removed from embedded system 210 and replaced with MCU coupler 350, thereby providing various connections between development tool 300 and device 200. In some implementations, MCU coupler 350 bypasses connections between MCU 100 and device 200, replacing them with connections between development tool 300 and device 200. In some implementations, MCU coupler 350 includes components and/or functionality of transceivers 220 as would be appreciated. In various implementations of the invention, MCU coupler 350 provides outputs from development tool 300 to device 200 and provides inputs to development tool 300 from device 200. As illustrated, in some implementations, development tool 300 provides in situ development, testing and/or debugging of device as would be appreciated.

Various components of development tool 300 are now described. In some implementations of the invention, virtual MCU 320 provides emulation of MCU 100, including, but not limited to, identical operation (or substantially identical operation) of all inputs and outputs, internal registers, memory, stacks, and/or other components of MCU 100. In some implementations, virtual MCU 320 utilizes native op codes of MCU 100, such that individual ops codes operate in an identical manner (or substantially identical manner) with virtual MCU 320 as they would with MCU 100. This ensures that software developed for MCU 100 via virtual MCU 320 performs consistently, and in some implementations, identically, between virtual MCU 320 and MCU 100. For purposes of this description, use of the term "substantially identical" recognizes that one thing is not precisely identical to another thing, yet their differences are not material.

In some implementations of the invention, virtual MCU 320 provides a virtual instantiation of MCU 100. In some implementations, virtual MCU 320 operates within development tool 300 in a manner identical to MCU 100. Virtual MCU 320 uses executable code developed for MCU 100 to be run and tested in a production or near production environment. In addition to providing the user with control over running individual op codes or snippets of code (i.e., a collection of op codes, typically sequential) and to providing insight to an impact of such op codes and/or snippets on emulated internal aspects of MCU 100, virtual MCU 320 provides real-time emulated operation of MCU 100 using larger compilations of code, including, but not limited to test/debug code and/or production (or near production) code as would be appreciated.

In some implementations of the invention, development tool 300 includes a command line 360 (not otherwise illustrated) that receives individual op codes, or series of op codes (sometimes referred to as snippets), etc., from a user, either directly or indirectly, to test such op codes on virtual MCU 320 and its effect on device 200. In some implementations, command line 360 may provide op codes in a native syntax and format of MCU 100. In some implementations, command line 360 may include an interpreter that converts another syntax (e.g., a programming language, an interpreted syntax, etc.) received from the user into one or more op codes in the native syntax and format of MCU 100. In some implementations, command line 360 converts mnemonics received from the user into one or more op codes in the native syntax and format of MCU 100. In some implementations, command line 360 permits the user to define functions or routines and then run such functions or routines by converting them into one or more op codes in the native syntax and format of MCU 100. In some implementations, virtual MCU 320 includes a text editor that edits, aggregates and/or stores larger numbers of op codes (or syntax, mnemonics, functions, routines, etc.) as files as would be appreciated. In some implementations, functions of command line 360 and text editor 370 may be combined as would be appreciated.

In some implementations, development tool 300 may control virtual MCU 320 to run a series of op codes consecutively, in real-time, as would be appreciated. In some implementations, development tool 300 may control virtual MCU 320 to run a series of op codes consecutively, step-by-step as controlled by a user, as would be appreciated. In some implementations, development tool 300 may control virtual MCU 320 to run a series of op codes in other fashion, such as at a reduced clock speed relative to that of MCU 100, at an increased clock speed relative to that of MCU 100, or other timing, as would be appreciated. In some implementations, development tool 300 may control virtual MCU 320 to run a series of op codes beginning at a user-specified location in memory. In some implementations, development tool 300 may control virtual MCU 320 to run a series of op codes ending at a user-specified location in memory or at end-defining op code.

In some implementations of the invention, development tool 300 includes a virtual analyzer (not otherwise illustrated) that provides a state (i.e., value, etc.) of any or all internal registers of virtual MCU 320. In some implementations of the invention, the virtual analyzer provides a state of one or more stacks of virtual MCU 320. In some implementations of the invention, the virtual analyzer provides values of memory (internal or external) of virtual MCU 320. In some implementations of the invention, the virtual analyzer provides a state of an instruction pointer of virtual MCU 320. In some implementations of the invention, the virtual analyzer provides a state of inputs and/or outputs of virtual MCU 320. Development tool 300 may provide such states, values, etc., described above to the user via a graphical user interface as would be appreciated.

In some implementations of the invention, development tool 300 includes a plurality of virtual MCUs 320, each for any number of different types, brands or versions of MCU 100. As would be appreciated, each of the plurality of virtual MCUs 320 provides emulation of a corresponding MCU 100, including but not limited to, identical operation (or substantially identical operation) of all inputs and outputs, internal registers, memory, and/or other components of the corresponding MCU 100, and in some implementations, utilizes the native op codes of MCU 100.

In such implementations, development tool 300 may be coupled to a corresponding MCU coupler 350, which is configured to connect development tool 300 to device 200 as described above. Such implementations permit a common development tool 300 to be used for developing, testing, and/or debugging software for a variety of different MCUs 100 as would be appreciated.

As discussed above, MCU 100 typically has limited memory, both for purposes of storing runtime or executable software (i.e., op codes) and storing data. As such, various test code, debug code and/or routines and/or data storage, when utilized, may exceed the memory capabilities of MCU 100, and hence may not be available to the user. In some implementations of the invention, virtual MCU 320 includes an expanded memory 310 (i.e., additional memory beyond that available to MCU 100) which may be used for such test code, debug code and/or routines and/or data storage. In such implementations, virtual MCU 320 operates in an identical fashion to MCU 100 except for an additional ability to address expanded memory 310 as would be appreciated.

In some implementations of the invention, a microcontroller programmer 330 is configured to transfer executable code to a memory of MCU 100. In some implementations, programmer 330 may receive executable code from other components of development tool 300 (e.g., virtual MCU 320 and/or its expanded memory 310, text editor 370, command line 360, etc.) as would be appreciated. In some implementations, programmer 330 may receive source code developed within development tool 300, or external thereto, and may be configured to compile and link such source code into executable code as would be appreciated.

Figure 4:
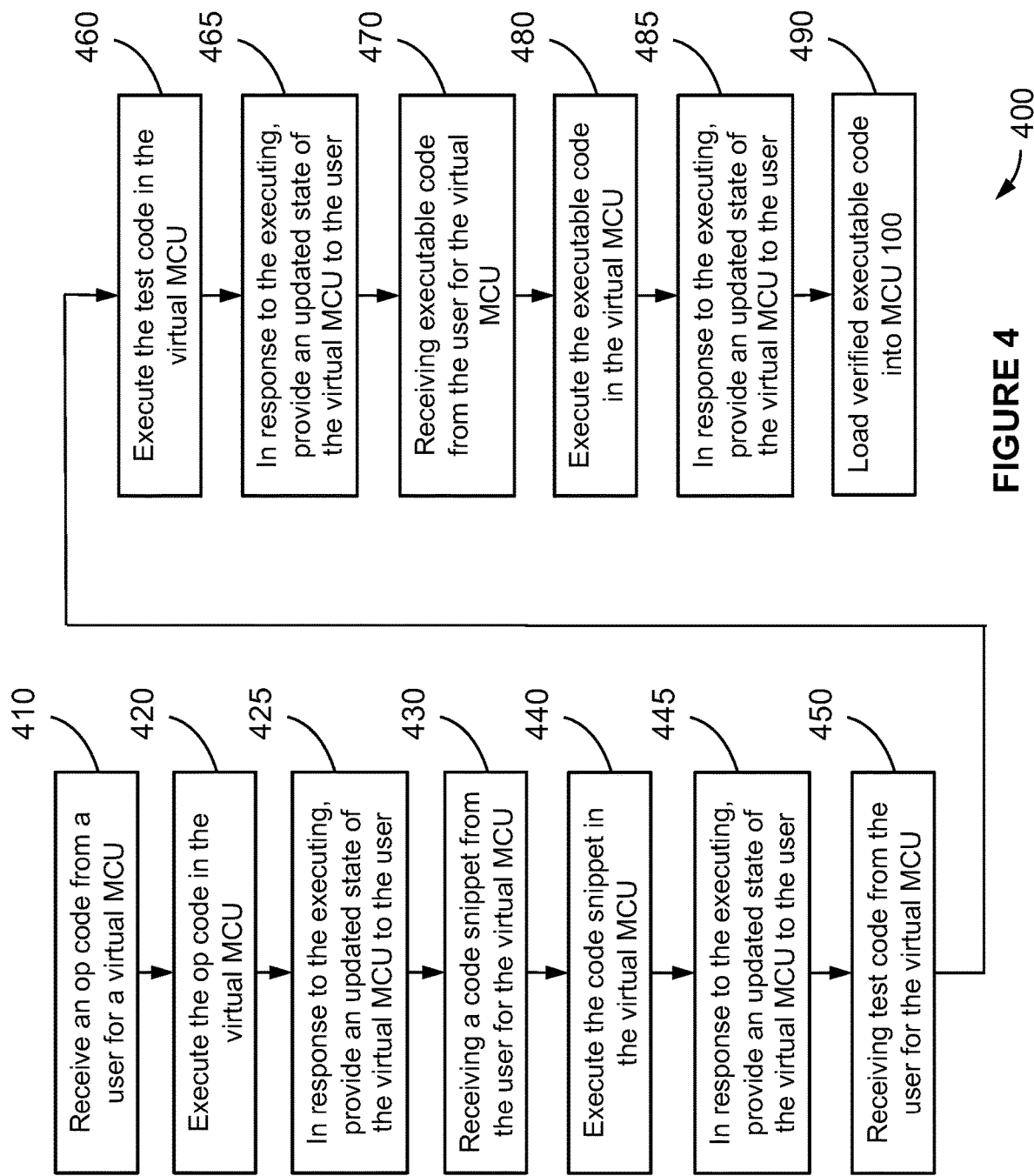
FIG. 4 illustrates an operation of various implementations of the invention.

FIG. 4 illustrates an operation of various implementations of the invention, and more particularly, an operation 400 of development tool 300 to develop, test, and debug software for MCU 100. In an operation 410, development tool 300 receives an op code from a user. In some implementations, development tool 300 receives the op code from the user via command line 360 or via text editor 370. In various implementations, certain op code(s), when executed, allow the user to test device 200 as would be appreciated. For example, certain op code(s) cause receipt of an input from device 200 or provide an output to device 200. In an operation 420, development tool 300 causes virtual MCU 320 to execute the op code(s). In an operation 425, in response to executing the op code(s), development tool 300 updates a state of virtual MCU 320 in accordance with its emulation of microcontroller 100 and provides an updated state of virtual MCU 320 to the user. In some implementations of the invention, the updated state is provided to the user via a graphical user interface. In some implementations, the user may use the updated state to verify operation of the op code(s) (i.e., verify the op code(s)). Any number of op code(s) may be verified in this manner to test out basic functionality and operation of device 200 and its interactions with virtual MCU 320.

In an operation 430, development tool 300 receives a code snippet from the user. In some implementations, the code snippet is an aggregation of various previously verified op codes. In some implementations, the code snippet is an aggregation of various previously verified op codes along with various unverified op codes. In some implementations, development tool 300 is configured to allow the user to combine previously verified op codes into the code snippet as would be appreciated. In some implementations, development tool 300 receives the code snippet from the user via command line 360. In some implementations, development tool 300 receives the code snippet from the user via text editor 370. In various implementations, certain code snippets, when executed, allow the user to test more complex aspects of device 200 and/or its interactions with virtual MCU 320 than individual op codes as would be appreciated.

In an operation 440, development tool 300 causes virtual MCU 320 to execute the code snippet. In an operation 445, in response to executing the code snippet, development tool 300 updates a state of virtual MCU 320 in accordance with its emulation of microcontroller 100 and provides an updated state of virtual MCU 320 to the user. In some implementations, the user may use the updated state to verify operation of the code snippet (i.e., verify the code snippet). Any number of code snippets may be verified in this manner to test out more complex functionality and operation of device 200 and its interactions with virtual MCU 320.

In an operation 450, development tool 300 receives test code from the user. In some implementations, the test code is an aggregation of various previously verified code snippets. In some implementations, the test code is an aggregation of various previously verified code snippets with various previously verified op codes. In some implementations, the test code is an aggregation of various previously verified code snippets with various previously verified op codes. In some implementations, the test code is an aggregation of various previously verified code snippets with various unverified code snippets or unverified op codes as would be appreciated. In any of the previous implementations, test code may further include a debug op code(s). Debug op codes include various op codes useful for testing and debugging code that typically are not included in production software. For example, debug op codes may include pauses or halts to stop execution of the test code; debug op codes may include storing an intermediate value of a calculation to a memory location during execution of the test code; debug op codes may include various additional functionality based on certain conditions that occur during execution of the test code; and/or debug op codes may include any op codes that facilitate testing and debugging software as would be appreciated. In some implementations, development tool 300 receives the test code from the user via command line 360. In some implementations, development tool 300 receives the test code from the user via text editor 370. In various implementations, test code, when executed, allows the user to test and debug various aspects of device 200 and/or its interactions with virtual MCU 320 as would be appreciated.

In an operation 460, development tool 300 causes virtual MCU 320 to execute the test code. In an operation 465, in response to executing the test code on virtual MCU 320, development tool 300 updates a state of virtual MCU 320 in accordance with its emulation of microcontroller 100 and provides an updated state of virtual MCU 320 to the user. In some implementations, the user may use the updated state to debug operation of the test code. In some implementations, the user may use the updated state to verify operation of the test code (i.e., verify the test code).

In some implementations of the invention, the test code impacts expanded memory 310. As discussed above, MCU 100 typically has limited memory. As a result, test code, with its additional debug op codes, may require more memory for executable code than MCU 100 has available or may require more memory for storing various debug values (i.e., data values) than MCU 100 has available. Thus, in accordance with various implementations of the invention, development tool 300 may utilize expanded memory 310 when executing test code (or any other code) on virtual MCU 320 to accommodate such additional memory requirements. Such testing would not be possible with conventional microcontroller emulators as they do not employ expanded memory 310. Once the test code is fully tested and debugged, the user may remove the debug op codes from the test code to generate executable production code.

In an operation 470, development tool 300 receives the executable production code from the user. In some implementations, development tool 300 receives the executable production code from the user via command line 360; though typically, development tool 300 receives the executable production code from the user via text editor 370.

In an operation 480, development tool 300 causes virtual MCU 320 to execute the executable production code. In an operation 485, in response to executing the executable production code on virtual MCU 320, development tool 300 updates a state of virtual MCU 320 in accordance with its emulation of microcontroller 100 and provides an updated state of virtual MCU 320 to the user. In some implementations, the user may use the updated state to test and/or debug operation of the executable production code. In some implementations, the user may use the updated state to verify operation of the executable production code (i.e., verify the executable production code).

Once execution of the executable production code on virtual MCU 320 is verified, in an operation 490, development tool 300 may load the executable production code into a memory of MCU 100 via MCU coupler 350.

While operation 400 is described in terms of operations 410-490, various operations 410-490 may be eliminated from operation 400 or combined with other operations 410-490 as would be appreciated. For example, operations 430, 440, and may be eliminated as would be appreciated (by forming op codes directly into test code); other operations may be similarly eliminated. In addition, various operations 410-490 may be repeated in the event that the relevant code fails to be confirmed/verified (e.g., work properly or as expected) as would be appreciated.

Furthermore, in some implementations, executable code, or portions thereof, may be developed and tested, partially or entirely, in a higher level language for a processor or microcontroller other than for MCU 100. Once testing of the executable code is complete on the other processor or microcontroller, then the executable code, or such portions, may be loaded into virtual MCU 320, using the corresponding op codes, and tested within development tool 300 as would be appreciated.

While the invention has been described herein in terms of various implementations, it is not so limited and is limited only by the scope of the following claims, as would be apparent to one skilled in the art. These and other implementations of the invention will become apparent upon consideration of the disclosure provided above. In addition, various components and features described with respect to one implementation of the invention may be used in other implementations as well.

What is claimed is:

1. A system for developing executable code for a microcontroller, the system comprising:
   a microcontroller development tool configured to operate on a general purpose computer, the development tool comprising:
      a virtual microcontroller configured to operate within the development tool in a manner substantially identical to an operation of the microcontroller, wherein the virtual microcontroller operates within the development tool using op codes native to that of the microcontroller, the virtual microcontroller further configured to receive inputs and provide outputs,
      an expanded memory beyond a memory available to the microcontroller, the expanded memory coupled to the virtual microcontroller and configured to store op codes or data for the virtual microcontroller, and
      a microcontroller programmer configured to transfer executable code to a memory of the microcontroller, wherein the executable code is developed within the development tool.

2. The system of claim 1, wherein the inputs are generated by a device coupled to the microcontroller.

3. The system of claim 1, wherein the outputs are generated in response to a user entering instructions via a command line.

4. The system of claim 1, wherein the outputs are generated in response to the virtual microcontroller running executable code.

5. The system of claim 1, further comprising a microcontroller coupler configured to couple the development tool to the microcontroller.

6. The system of claim 5, wherein the microcontroller programmer is configured to transfer executable code to the memory of the microcontroller via the microcontroller coupler.

7. A method for developing, testing, and/or debugging software for a microcontroller, the method comprising:
   receiving, from a user via a command line of a development tool operating on a computing processor, a test code for a virtual microcontroller, wherein the virtual microcontroller is configured to operate within the development tool in a manner substantially identical to an operation of the microcontroller, wherein the virtual microcontroller is further configured to operate within the development tool using op codes native to that of the microcontroller, wherein the development tool comprises an expanded memory beyond a memory available to the microcontroller, wherein the expanded memory is coupled to the virtual microcontroller and is configured to store op codes or data for the virtual microcontroller, wherein the test code includes at least one debug op code;
   executing the test code including the at least one debug op code in the virtual microcontroller, wherein executing the test code utilizes the expanded memory;
   in response to executing the test code, updating the state of the virtual microcontroller to the user to verify the test code;
   receiving executable code, wherein the executable code includes the verified test code without the at least one debug op code;
   executing the executable code in the virtual microcontroller;
   in response to executing the executable code, updating the state of the virtual microcontroller to the user to verify the executable code; and
   loading the verified executable code from the development tool into the microcontroller.

\* \* \* \* \*